July 21, 1953     B. J. HOMKES     2,645,945
CONTROL DEVICE ADJUSTMENT MEANS
Filed March 29, 1952
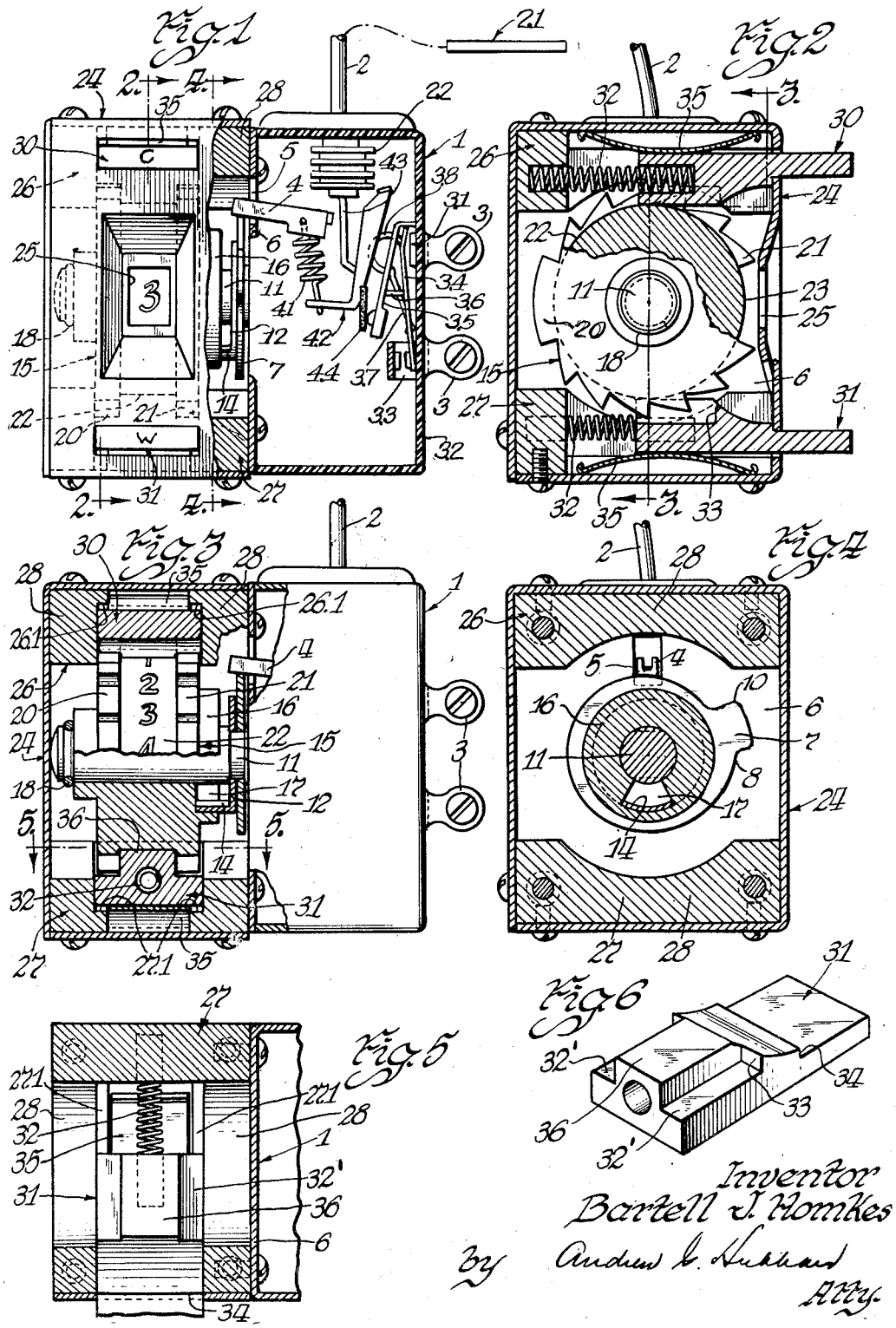
Inventor
Bartell J. Homkes Patented July 21, 1953

2,645,945

UNITED STATES PATENT OFFICE 2,645,945

CONTROL DEVICE ADJUSTMENT MEANS

Bartell J. Homkes, Chicago, Ill., assignor to General Electric Company, a corporation of New York Application March 29, 1952, Serial No. 279,373

4 Claims. (Cl. 74—161)

This invention relates to an improved means for adjusting the control setting of thermostats or the like.

It is a particular object of the invention to provide an improved mechanism by which a desired change in the temperature setting of a thermostat may be effected by manually operating one or the other of a pair of adjustment devices.

It is another object of the invention to provide a thermostat adjustment means by which the operator may change the control setting from a present to a desired control point even though the thermostat may be so located or obscured that the operator is unable to read the usual index markings.

Usually, thermostat adjustment devices include a rotatable shaft which operates a camming device or its equivalent, a suitably pitched screw; and the obvious and structurally simplest method to effect the adjustment is by rotating a knob or the like fixed on said shaft. The knobs usually carry a pointer indexing the designations on an escutcheon plate, said designations being arbitrarily indicative of the temperature level at which the control becomes effective. Where controls are placed on a breaker strip of the cabinet, or in other plainly visible and accessible locations, these adjustment devices are entirely satisfactory. However, there is a present design trend to place the thermostat at some less accessible, but structurally more desirable location within the cabinet, and the new locations have not always been attractive to the user because of their relative inaccessibility or the difficulty of seeing the control point at which the thermostat is set, or to which it is to be set.

A thermostat adjustment pursuant to the present invention may be used at any location which can be reached with a finger of the operator. In place of the conventional knob, which must be grasped with thumb and forefinger and requires a certain amount of wrist manipulation, I provide for pushbutton adjustment in which one button is pressed when it is desired to lower the control temperature and another operated to raise the control temperature. Each depression of the button advances or reduces the temperature setting a predetermined amount, and by providing suitable stop means, signifying either the upper or lower limit of the adjustment, the operator may set the thermostat to a desired control point merely by pressing on the appropriate button the number of times necessary to achieve the desired setting. If the index plate is not readily visible, the operator may press either button to the stop point, and then operate the other button to "backtrack" the number of steps necessary to reach the desired setting. Thus, the operator need not actually see a number index, although one is provided.

A feature of my invention is that it may be applied to any thermostat in which adjustment is made by the rotation of a shaft.

A presently preferred form of the invention will best be understood by the following specification read with the accompanying drawing, in which Fig. 1 is a front elevation of the invention as applied to a thermostat of the cam-plate setting type, certain portions of the casing having been broken away to reveal underlying structure; Fig. 2 is an end elevation on lines 2—2 of Fig. 1; Fig 3 is a front elevational section taken on lines 3—3 of Fig. 2; Fig. 4 is an end elevation taken on lines 4—4 of Fig. 1 showing the cam plate adjustment means of a thermostat; Fig. 5 is a plan section taken on lines 5—5 of Fig. 3; and Fig. 6 is a perspective of a pawl.

Referring now to Figs. 1 and 4, the refrigerator thermostat 1 is presumed to embody conventional devices pursuant to which the vapor pressure within a capillary tube 2 connected to a temperature-sensitive bulb 2.1 expands or permits the contraction of a bellows or the like 2.2 which effects the operation of a switch or equivalent serving the contacts 3 connected into the electrical system of the refrigeration apparatus. By conventional means a lever 4 riding in a slot 5 of a casing plate 6 adjusts the control point of the thermostat as said lever raises or lowers by the action of the rotatable plate cam 7. For example, lever 4 is pivotally carried by the side walls of the thermostat housing and by means of a coil spring 4.1 is operatively associated with a bell crank 4.2 which also is pivotally carried by the side walls of the housing. Said bell crank has a rigid tongue 4.3 engaging with the free end of bellows 2.2. Spring 4.1 is arranged to be under tension throughout the full scope of operation of the thermostat and its effect is to urge bell crank 4.2 into clockwise rotation about its pivot, as viewed in Fig. 1. Rotation of lever 4 is a clockwise direction will increase the spring load and will impose a greater loading on the bellows 2.2. The direction of rotation of bell crank 4.2 follows the expansion and contraction of the bellows.

The contact system is of a conventional snap-acting type. The uppermost of the pair of terminals 3 is electrically connected to a terminal plate 3.1, mounted on the insulated wall or plate 3.2 forming a part of the thermostat housing. The other terminal is electrically connected to a U-shaped terminal plate 3.3 having a suitable fixed contact. A spring contact arm 3.4 is anchored at plate 3.1 and extends into the U-shaped terminal plate 3.3. It has at its free end a suitable contact element. A lever 3.5 of spring metal self-biased for clockwise rotation as viewed in Fig. 1, is anchored at one end to said plate 3.1. The free end of lever 3.5 is flanged for rigidity and is dimpled to provide a bearing surface in contact with a plate 4.4 of insulation material, said plate being carried by the bell crank 4.2. Lever 3.5 has a lanced-out tongue 3.6 which surrounds a rigid toggle member 3.7 pivotally interposed between the lever 3.4 and an overthrow spring 3.8, the other end of which is pivotally anchored to lever 3.4 near the fixed end thereof. It will be understood that the toggle member passes through an opening in the tongue 3.6 whereby lever 3.5 is effective to push or pull the toggle member according to the direction of operation of the lever. As the bellows expands therefore, it urges the bell crank 4.2 into counterclockwise rotation and this in turn enforces the similar rotation of lever 3.5. The latter movement produces a clockwise rotation of toggle member 3.7 and as its overcenter point is reached, the springable contact lever 3.4 will snap into closed circuit position. Contraction of the bellows by reason of lowering refrigerator temperature, causes the bell crank 4.2 to move away from the spring lever 3.5 and because of its self-bias, said spring lever maintains contact with the bell crank. The tongue 3.6 engages the toggle member from the rear and throws it in a direction enforcing an open circuit position. The plate cam 7 has the respective stop shoulders 8 and 10 establishing the limits of adjustment of the thermostat. Cam 7 is non-rotatably mounted on the shaft 11 which in turn is journalled suitably within the thermostat housing; and also non-rotatably mounted on said shaft is a drive plate 12 having a finger 14 extending therefrom.

The present invention provides pawl and ratchet means for step-by-step rotation of the shaft 11 and its thereon-mounted cam plate, said rotation being in one or the other direction according to whether the temperature setting is to be increased or decreased.

Accordingly, I mount on said shaft 11 a ratchet wheel 15 having a rather large hub 16 provided with a pocket 17 into which extends the finger 14. Said finger engages with side walls thereof as appears in Fig. 4. The ratchet wheel, which may be secured on the shaft 11 by a snap ring 18 or other suitable means, has spaced ratchet portions 20, 21 and an intermediate cylindrical barrel 22 on which are inscribed about its periphery suitable indicia to indicate the increase or decrease of temperature according to the direction of rotation of the ratchet wheel. Purely by way of example, the barrel may be marked "Off" and "1" to "6." "1" may represent the setting for warmest refrigerator temperature and "6" the setting for the coldest. It will be apparent that more than seven positions may be provided for by increasing the number of ratchet teeth. The teeth are formed on the respective ratchet portions 20 and 21, and occupy diametrically opposed fractions of the total periphery. It will be noted that the respective upper and lower series of ratchet teeth have uniform angular spacing and are in opposition; that is, their effective surfaces face in opposite directions. There is a toothless portion 23 between the respective series of teeth, said portion establishing a position beyond which the ratchet wheel may not be rotated by action of the pawls later described.

A casing 24 may be formed out of sheet metal for attachment to the housing portion of the thermostat. The front casing wall is provided with a window 25 through which to view the markings on barrel 22. Upper and lower guide blocks 26, 27 are secured within the casing. Each said guide block is of identical shape. Considering guide block 26 as typical, it will be observed that it is generally U-shaped, with legs 28 straddling the ratchet wheel and extending normal to the shaft 11. The opposed surfaces of the legs slidably receive the respective ratchet-operating pawls 30 and 31. Extending between the base of each guide block and its associated pawl is a compression spring 32 which urges the pawl to the right of Fig. 2. The pawls are identical. Considering pawl 31 as typical, it will be noted from Fig. 6 that it is formed with shoulders 32', near one end of each of which is formed a drive tooth 33. A shoulder 34 engages with the front wall of casing 24 to limit the outward movement of the pawl, and a button or finger piece projects through an opening of the casing wall. Finger pressure on the respective buttons will drive them to the left of Fig. 2 and the drive teeth of the operated pawl will engage the adjacent ratchet teeth to rotate the ratchet wheel one step.

A leaf spring 35 interposed between the housing and each pawl urges the pawls into association with the ratchet while permitting displacement thereof as the ratchet teeth cam over a pawl during its return stroke. The rails 26.1 and 27.1 which overlie the pawls (Fig. 3) advantageously limit the extent of displacement.

It is advantageous to provide means for preventing rotation of the ratchet wheel as the drive teeth of a pawl cam over the succeeding tooth of the ratchet wheel on the return stroke of the pawl. This may be accomplished by providing on each pawl a central guide portion 36, the width of which is slightly less than the spacing between the ratchet portions 20 and 21, and the depth sufficient to permit the guide portion to rest on the surface of the barrel 22 while holding the pawl shoulders 32' spaced from the ratchet teeth as shown in Fig. 3.

If the user wishes to operate the refrigerator at a lower cabinet temperature, he pushes inwardly on the upper pawl 30, and each depression produces a rotation of cam 7 which displaces the setting adjustment cam follower 4 according to the cam contour. A clicking sound as the pawl cams over the next ratchet tooth on the return stroke of the pawl indicates that an adjustment stroke has been completed. The inactive pawl—in this case, the lower one—maintains a resilient frictional contact with the barrel of the ratchet to hold it against retrograde movement. After the third such operation from the Fig. 2 setting, however, the gap 23 is presented over the pawl teeth 33, and not only will the return stroke not be characterized by a clicking sound, but it will have a different "feel" to the operator because of the free return movement of the pawl. At this time, of course, the cam would have reached its stop 10. The operator would then know that the thermostat was at its coldest setting; and if he did not wish it to be thus, he would simply reverse the rotation a suitable number of steps by manipulation of the pawl 31. Thus, even if the operator could not see the index number on the barrel of the ratchet, it is a simple matter to obtain the desired setting by bringing the thermostat to its coldest temperature setting and then backing the appropriate number of steps to the desired intermediate temperature. If the operator wishes to shut the unit off, he would, of course, press the "W" button 31 to the limit of rotation of the ratchet wheel. Although it is not necessary because the gap 23 limits the rotation of the pawl, a stop pin or equivalent (not shown) may be provided for engagement with the cam portion 8 to form a positive limit to the rotation of the cam.

While there has been described what are at present considered to be the preferred embodiments of the invention, it will be understood that various modifications may be made therein, and it is intended to cover in the appended claims all such modifications as fall within the true spirit and scope of the invention.

I claim:

1. In a thermostat or the like having means for setting the same for response to a desired temperature condition, said setting means including a shaft rotatable in one or another direction according to whether the control point is to be raised or lowered with respect to a present setting; the improvement in means for rotating said shaft in a desired direction, comprising a ratchet wheel non-rotatably mounted on said shaft, a first series of ratchet teeth formed over a predetermined arc of the periphery of said wheel, a second series of ratchet teeth formed over a second predetermined arc of said periphery, said series of teeth being arranged in opposing relationship, said ratchet wheel having a reduced diameter portion concentric with said periphery and spaced axially from said series of teeth, a housing for said ratchet wheel, a first pawl slidably supported within said housing for operative association with said first series of teeth to produce step-by-step rotation of said wheel in one direction upon reciprocation of said pawl, a second pawl slidably supported within said housing for similar operative association with said second series of teeth for rotation of said wheel in the opposite direction, each said pawl having a finger piece projecting from said housing for manual operation of said pawls in wheel-rotating direction, spring means biasing said pawls in a return direction, means on said pawls engageable with said ratchet wheel reduced diameter portion, and spring means biasing said pawls resiliently into engagement with said wheel portion.

2. In a thermostat or the like having means for setting the same for response to a desired temperature condition, said setting means including a shaft rotatable in one or another direction according to whether the control point is to be raised or lowered with respect to a present setting; the improvement in means for rotating said shaft in a desired direction, comprising a ratchet wheel non-rotatably mounted on said shaft, a first series of ratchet teeth formed over a predetermined arc of the periphery of said wheel, a second series of ratchet teeth formed over a second predetermined arc diametrically opposite said first series of teeth, the respective series of teeth being arranged in opposing relationship, said ratchet wheel having a reduced diameter portion concentric with said periphery and spaced axially from said series of teeth, a housing for said ratchet wheel, a first pawl slidably supported within said housing for operative association with said first series of teeth to produce step-by-step rotation of said wheel in one direction upon reciprocation of said pawl, a second pawl slidably supported within said housing for similar operative association with said second series of teeth for rotation of said wheel in the opposite direction, each said pawl having a finger piece projecting from said housing for manual operation of said pawls in wheel-rotating direction, means for limiting the extent of rotation in either direction, spring means biasing said pawls in a return direction, means on said pawls engageable with said ratchet wheel reduced diameter portion, and spring means biasing said pawls resiliently into engagement with said wheel portion.

3. In a thermostat or the like having means for setting the same for response to a desired temperature condition, said setting means including a shaft rotatable in one or another direction according to whether the control point is to be raised or lowered with respect to a present setting; the improvement in means for rotating said shaft in a desired direction, comprising a ratchet wheel non-rotatably mounted on said shaft, a first series of ratchet teeth formed over a predetermined arc of the periphery of said wheel, a second series of ratchet teeth formed over a second predetermined arc diametrically opposite said first series of teeth, the respective series of teeth being arranged in opposing relationship and said series being spaced apart a distance substantially greater than the spacing between adjacent teeth of either series, said ratchet wheel having a reduced diameter portion concentric with said periphery and spaced axially from said series of teeth, a housing for said ratchet wheel, a first pawl slidably supported within said housing for operative association with said first series of teeth to produce step-by-step rotation of said wheel in one direction upon reciprocation of said pawl, a second pawl slidably supported within said housing for similar operative association with said second series of teeth for rotation of said wheel in the opposite direction, each said pawl having a finger piece projecting from said housing for manual operation of said pawls in wheel-rotating direction, spring means biasing said pawls in a return direction, means on said pawls engageable with said ratchet wheel reduced diameter portion, and spring means biasing said pawls resiliently into engagement with said wheel portion.

4. In a thermostat or the like having means for setting the same for response to a desired temperature condition, said setting means including a shaft rotatable in one or another direction according to whether the control point is to be raised or lowered with respect to a present setting; the combination of a ratchet wheel non-rotatably mounted on said shaft, said ratchet wheel comprising a barrel having at each end a ratchet tooth portion of uniformly greater radius than said barrel, a first series of ratchet teeth formed in said tooth portion about a predetermined arc thereof, a second series of ratchet teeth formed in a diametrically opposite ratchet tooth portion, the respective series of teeth being arranged in opposing relationship, a housing for said ratchet wheel, a pair of pawl-guiding means fixed within said housing and having guide legs extending on each side of said ratchet teeth portions normal to the axis thereof, a first pawl slidably engaging the guide legs of one of said guiding means and in operative association with said first series of teeth to produce step-by-step rotation of said wheel upon reciprocation of said pawl, a second pawl slidably engaging the guide legs of the other guide means and in operative association with said second series of teeth for similar rotation of said ratchet wheel in the opposite direction, each said pawl having a portion disposed between said ratchet tooth portions and in resilient frictional contact with said barrel, means for reciprocating said pawls, and means for limiting the extent of rotation of said ratchet wheel in either direction.

BARTELL J. HOMKES.

References Cited in the file of this patent

UNITED STATES PATENTS

| Number | Name | Date |
|---|---|---|
| 555,226 | Straley | Feb. 25, 1896 |
| 657,303 | Webber | Sept. 4, 1900 |
| 1,908,626 | Ford | May 9, 1933 |
| 2,595,967 | McCloy | May 6, 1952 |
| 2,602,337 | Nawman | July 8, 1952 |

FOREIGN PATENTS

| Number | Country | Date |
|---|---|---|
| 195,891 | Great Britain | Apr. 12, 1923 |